United States Patent
Kuo (10) Patent No.: US 9,039,298 B2
(45) Date of Patent: May 26, 2015

(54) OPTICAL SIGNAL TRANSMISSION DEVICE

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/905,159

(22) Filed: May 30, 2013

(65) Prior Publication Data

US 2014/0205247 A1    Jul. 24, 2014

(30) Foreign Application Priority Data

Dec. 28, 2012    (TW) .............................. 101150722 A (51) Int. Cl.
*G02B 6/38* (2006.01)
*G02B 6/42* (2006.01)

(52) U.S. Cl.
CPC .............. *G02B 6/383* (2013.01); *G02B 6/3825* (2013.01); *G02B 6/3839* (2013.01); *G02B 6/4292* (2013.01)

(58) Field of Classification Search
CPC .... G02B 6/383; G02B 6/3825; G02B 6/3839; G02B 6/4292
USPC ..................................................... 385/65, 83
See application file for complete search history.

(56) References Cited

U.S. PATENT DOCUMENTS

| | | | | |
|---|---|---|---|---|
| 6,491,442 | B1* | 12/2002 | Murakami et al. ............... | 385/58 |
| 7,207,726 | B2* | 4/2007 | Kaneko et al. ................... | 385/70 |
| 7,329,054 | B1* | 2/2008 | Epitaux et al. ................... | 385/89 |
| 7,641,397 | B2* | 1/2010 | Koreeda et al. .................. | 385/65 |
| 2003/0044123 | A1* | 3/2003 | Kiani et al. ...................... | 385/59 |
| 2003/0053768 | A1* | 3/2003 | Brezina et al. ................... | 385/92 |
| 2003/0091297 | A1* | 5/2003 | Hung et al. ....................... | 385/83 |
| 2003/0180006 | A1* | 9/2003 | Loh et al. ......................... | 385/88 |
| 2011/0200284 | A1* | 8/2011 | Zhovnirovsky et al. ......... | 385/33 |
| 2012/0155809 | A1* | 6/2012 | Yu et al. ........................... | 385/74 |

* cited by examiner

*Primary Examiner* — Charlie Y Peng
(74) *Attorney, Agent, or Firm* — Novak Druce Connolly Bove + Quigg LLP (57) ABSTRACT

An optical signal transmission device includes a first and a second photoelectric converting device, a first and a second connector, a plurality of first optical fibers, a plurality of second optical fibers, and an adapter module. The first and the second photoelectric converting devices are electrically connected with the first and the second electronic device. The first and the second connectors separately define a plurality of first and second fixed grooves. The adapter module includes a first and a second adapter portion. The first adapter portion defines a plurality of third fixed grooves. The second adapter portion defines a plurality of fourth fixed grooves. Several optical couplings are generated between the first connector and the first photoelectric converting device, between the second connector and the second photoelectric converting device, and between the first adapter portion and the second adapter portion.

8 Claims, 6 Drawing Sheets

OPTICAL SIGNAL TRANSMISSION DEVICE

BACKGROUND

1. Technical Field

The present disclosure relates to an optical signal transmission device.

2. Description of Related Art

Transfer of data between electronic devices generally occurs via electrical signals. During the transfer, external electromagnetic waves may interfere, resulting in poor transmission quality. However, optical signals are not affected by the external electromagnetic waves. Therefore, it is desired to provide a signal transmittance device for transmitting information with less interference.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
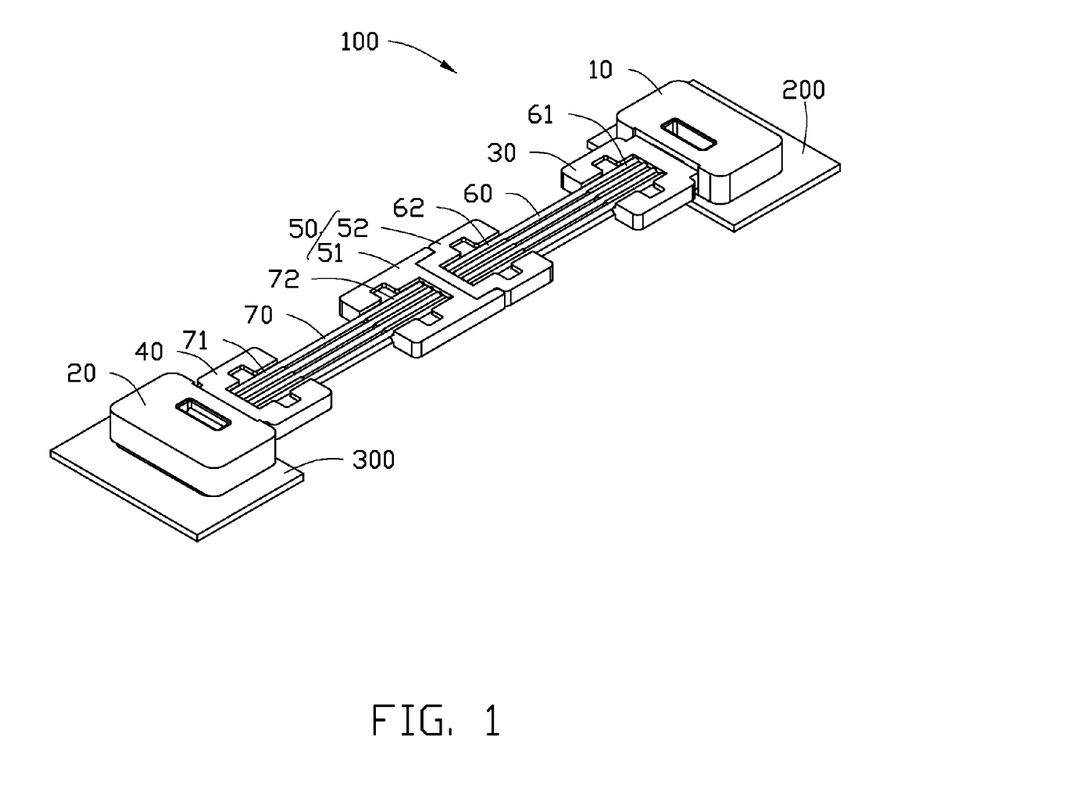
FIG. 1 is a schematic view of an optical signal transmission device, and a schematic view of the optical signal transmission device connecting with a first electronic device and a second electronic device.

Embodiments will now be described in detail below with reference to the drawings. FIG. 1 is a schematic view of an optical signal transmission device 100, and a schematic view of the optical signal transmission device 100 in communication with a first electronic device 200 and a second electronic device 300. The optical signal transmission device 100 includes a first photoelectric converting device 10, a second photoelectric converting device 20, a first connector 30, a second connector 40, an adapter module 50, a plurality of first optical fibers 60, and a plurality of second optical fibers 70. The first photoelectric converting device 10 is electrically connected to the first electronic device 200, which is configured to receive electrical signals from the first electronic device 200, and convert the electrical signals into optical signals. The first photoelectric converting device 10 is also configured to receive external optical signals, convert the optical signals into electrical signals, and output the electrical signals to the first electronic device 200. The second photoelectric converting device 20 is electrically connected to a second electronic device 300, which is configured to receive electrical signals from the second electronic device 300, and convert the electrical signals into optical signals. The second photoelectric converting device 20 is also configured to receive the external optical signals, convert the received optical signals into electrical signals, and outputs the electrical signals to the second electronic device 300.

Figure 2:
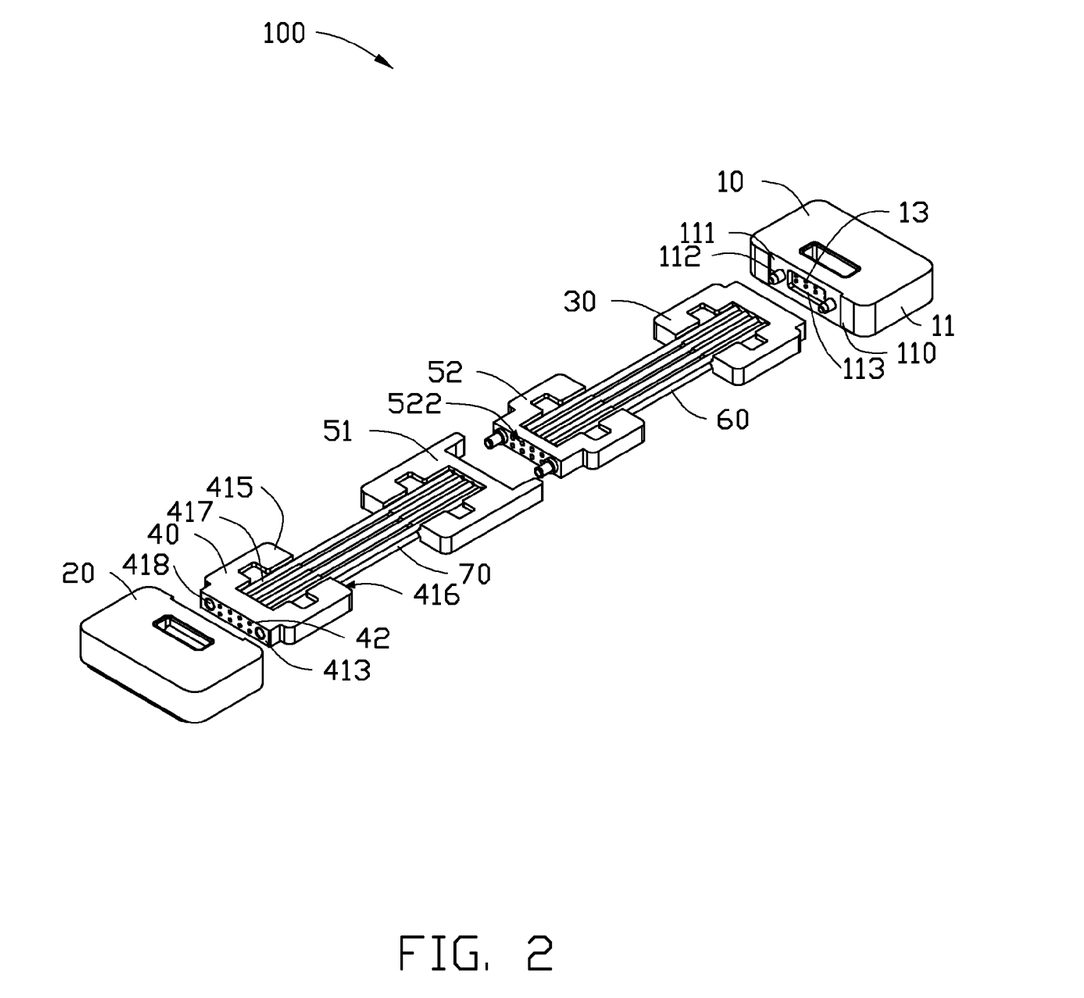
FIG. 2 is an exploded view of an optical signal transmission device of FIG. 1.

FIG. 2 shows that the first photoelectric converting device 10 includes a hollow first body 11 and a plurality of first condensing lenses 13, the first body 11 is substantially cuboid, and includes a first fixed surface 110. The first fixed surface 110 defines a first housing groove 111, two first positioning members 112 (e.g., positioning columns) are set inside the first housing groove 111. In addition, the first housing groove 111 defines a first recess 113. The plurality of first condensing lenses 13 are received inside the first body 11, and are exposed from the first recess 113. In the present embodiment, the first recess 113 is located between the two first positioning members 112. The first photoelectric converting device 10 also includes photoelectric converters set on the first electronic device 200, such as a photodiode and a laser diode.

Figure 3:
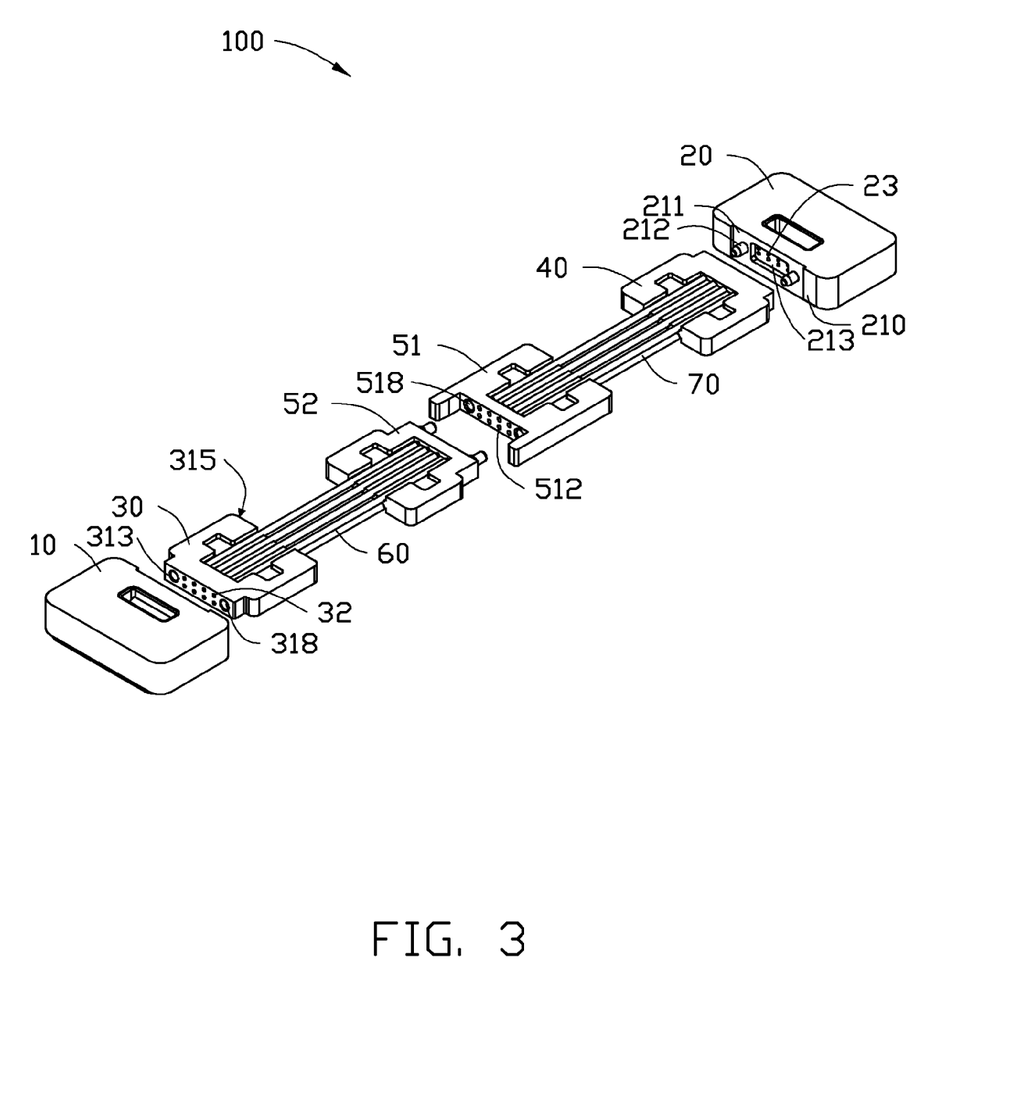
FIG. 3 is an exploded view of an optical signal transmission device of FIG. 1 from another angle.

FIG. 3 shows that the structure of the second photoelectric converting device 20 is same as that of the first photoelectric converting device 10, and includes a second fixed surface 210. The second fixed surface 210 defines a second housing groove 211; the second housing groove 211 defines a second recess 213. The second photoelectric converting device 20 includes a plurality of second condensing lenses 23, exposed from the second recess 213. Two second positioning members 212 (e.g., positioning columns) are set inside the second housing groove 211. The second photoelectric converting device 20 also includes photoelectric converters set on the second electronic device 300, such as a photodiode and a laser diode.

Figure 4:
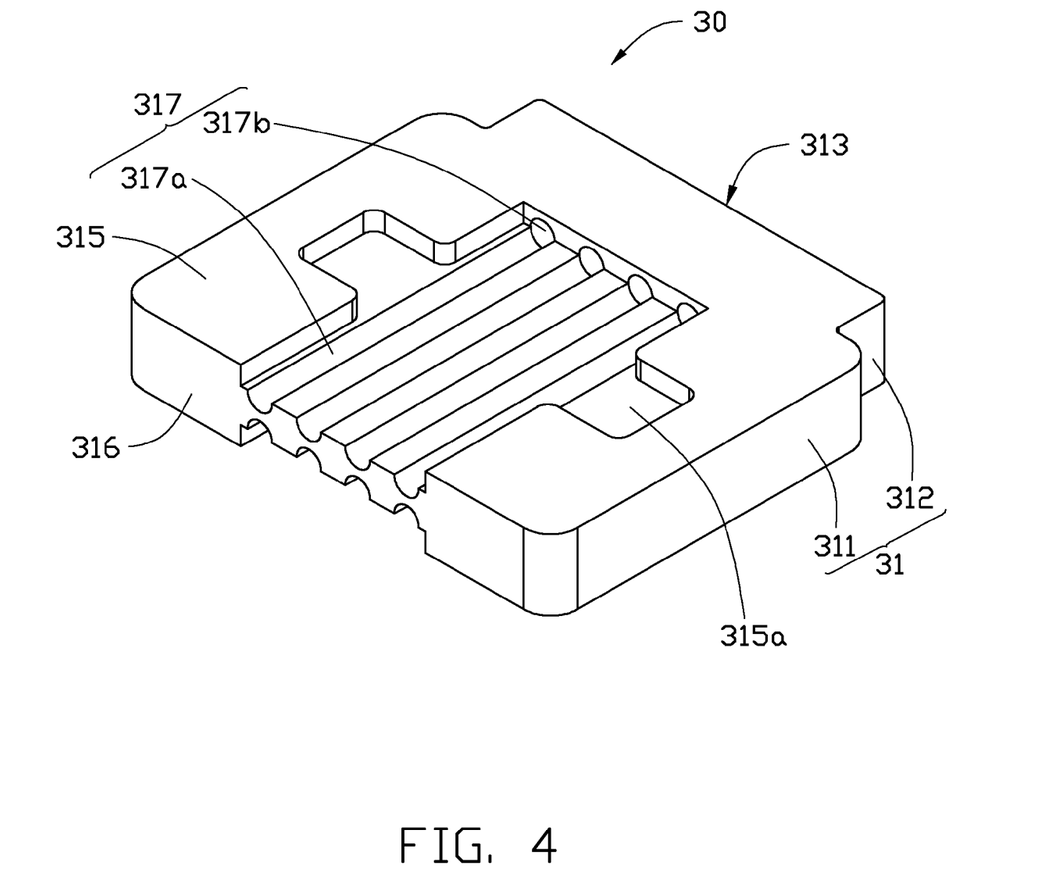
FIG. 4 is a schematic view of a first connector of the optical signal transmission device of FIG. 2.

FIG. 4 shows that a first connector 30 is docked with the first photoelectric converting device 10. The first connector 30 includes a hollow second body 31 and a plurality of first optical coupling lenses 32 (as shown in FIG. 3). The second body 31 includes a first carrying portion 311 and a first protrusion portion 312 extending outward from the first carrying portion 311. A size of the first protrusion portion 312 matches with the first housing groove 111, enabling the first protrusion portion 312 to be received into the first housing groove 111, furthermore, ensuring the first connector 30 is aligned with the first photoelectric converting device 10. The first protrusion portion 312 includes a first butting surface 313 facing towards the first fixed surface 110.

The first carrying portion 311 includes two first carrying surfaces 315 opposite to each other and a first backside 316 opposite to the first butting surface 313. Each of the first carrying surfaces 315 defines a number of first fixed grooves 317; the first fixed grooves 317 are substantially parallel to each other. Each extending direction of the first fixed grooves 317 is perpendicular to the first butting surface 313, and passes through the first butting surface 313 and the first backside 316. In the present embodiment, each of the first carrying surfaces 315 defines a first receiving groove 315a. The first fixed grooves 317 define first trenches 317a and first through holes 317b. The first trenches 317a set on the bottom surface of the first receiving groove 315a, the first through holes 317b pass through an inner wall of the first receiving groove 315a and the first butting surface 313, and conductively connected with the first trenches 317a. The plurality of first optical coupling lenses 32 are received into the plurality of first through holes 317b, and are exposed from the first butting surface 313. The first butting surface 313 defines two third positioning members 318 (e.g., positioning hole) corresponding to the first positioning members 112. The two third positioning members 318 match with the two first positioning members 112, enabling the plurality of first optical coupling lenses 32 to be aligned with a plurality of first condensing lenses 13, to complete an optical coupling. In the present embodiment, the plurality of first optical coupling lenses 32 are located between the two third positioning members 318.

FIG. 2 shows that the structure of the second connector 40 is the same as the first connector 30. The second connector 40 docked with the second photoelectric converting device 20. The second connector 40 defines a second butting surface 413, a second backside 416, a plurality of second optical coupling lenses 42 and two fourth positioning members 418 (e.g., positioning hole). The two fourth positioning members 418 match with the two second positioning members 212 (as shown in FIG. 3), enabling the plurality of second optical coupling lenses 42 to be precisely aligned with a plurality of second condensing lenses 23. The second connector 40 includes two opposite second carrying surfaces 415, both of the two second carrying surfaces 415 define a number of the second fixed grooves 417, the second fixed grooves 417 are substantially parallel to each other.

Figure 5:
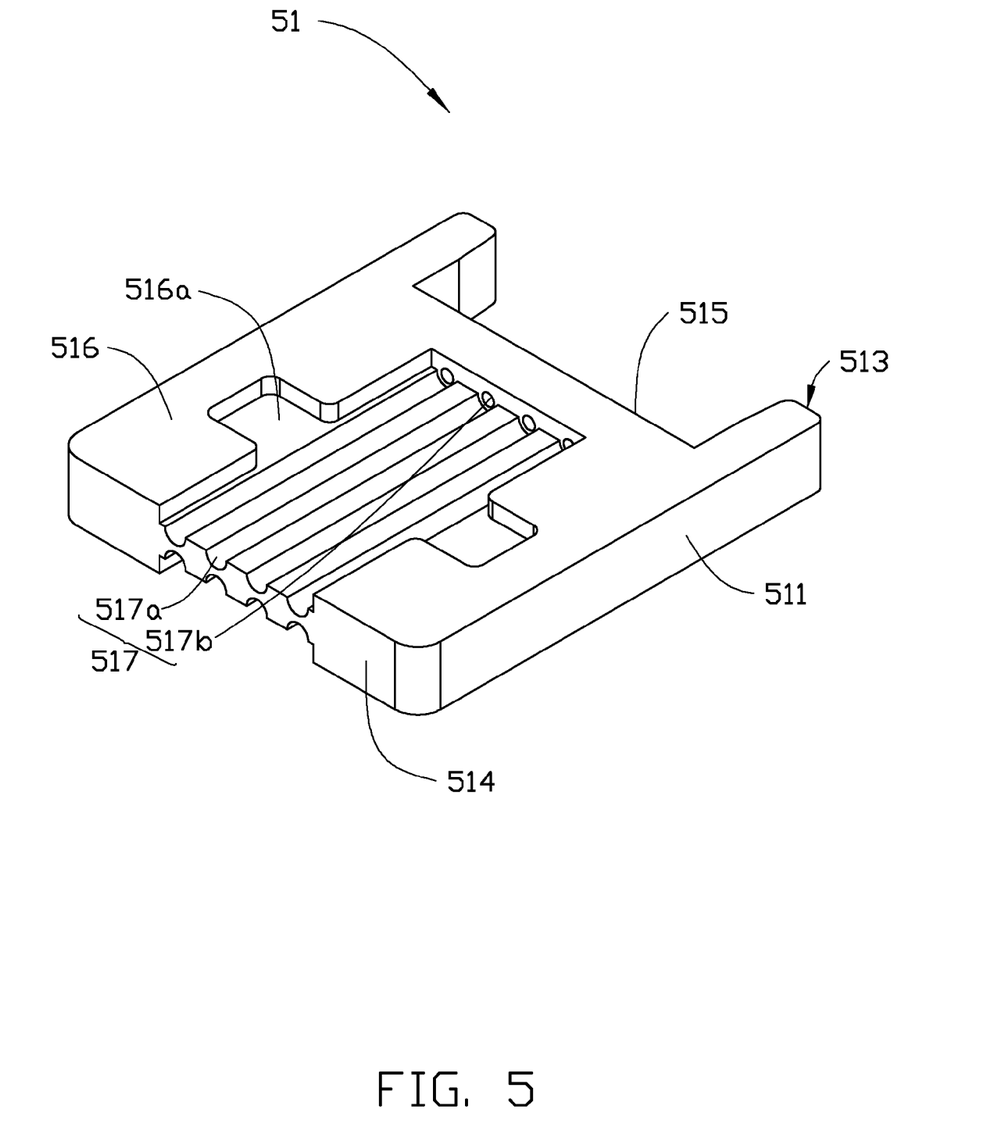
FIG. 5 is a schematic view of a first adapter of the optical signal transmission device of FIG. 2.

An adapter module 50 includes a first adapter portion 51 and a second adapter portion 52, both of the first adapter portion 51 and the second adapter portion 52 couple with each other. FIG. 5 shows that the first adapter portion 51 includes a third body 511 and a plurality of third optical coupling lenses 512 (as shown in FIG. 3). The third body 511 includes a third butting surface 513 and an opposite third backside 514. The third butting surface 513 includes a third receiving groove 515. The first adapter potion 51 also includes two opposite third carrying surfaces 516, both of the two third carrying surfaces 516 define a number of third fixed grooves 517, the third fixed grooves 517 are substantially parallel to each other. Each of an extending direction of the third fixed grooves 517 is perpendicular to the third butting surface 513, and passes through the bottom surface of the third receiving groove 515 and the third backside 514. In the present embodiment, each of the third carrying surfaces 516 defines a second receiving groove 516a. The third fixed groove 517 includes second trenches 517a and second through holes 517b. The second trenches 517a set on the bottom surface of the second receiving groove 516a, the second through holes 517b pass through an inner wall of the second receiving groove 516a and the third butting surface 513, and are conductively connected with the second trenches 517a. The plurality of third optical coupling lenses 512 is received into the plurality of second through holes 517b, and is exposed from a bottom surface of the third receiving groove 515. The bottom surface of the third receiving groove 515 defines two fifth positioning members 518 (e.g., positioning hole). In the present embodiment, the plurality of third optical coupling lenses 512 is located between the two fifth positioning members 518.

Figure 6:
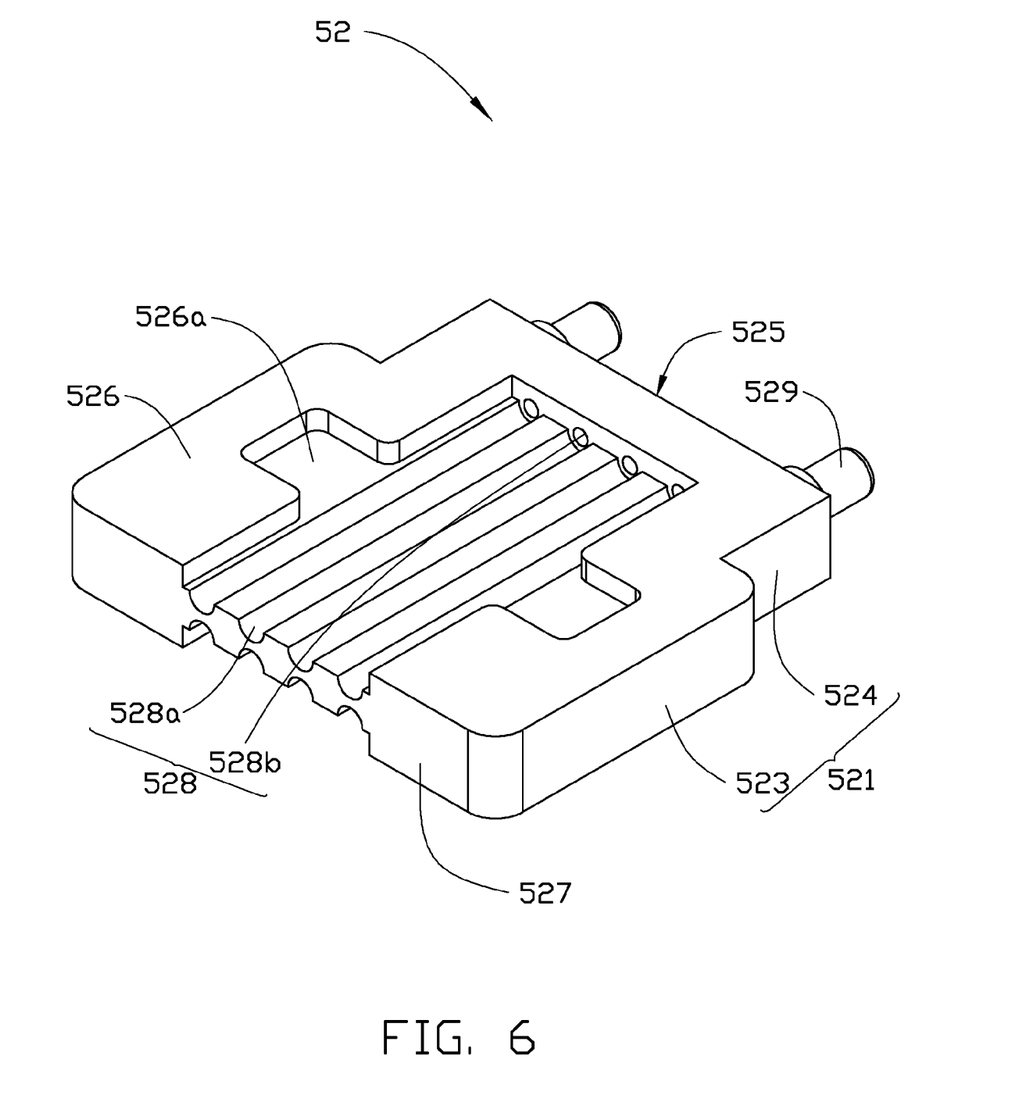
FIG. 6 is a schematic view of a second adapter of the optical signal transmission device of FIG. 2.

FIG. 6 shows that the second adapter portion 52 includes a fourth body 521 and a plurality of fourth optical coupling lenses 522 (as shown in FIG. 2). The fourth body 521 includes a second carrying portion 523 and a second protrusion portion 524 extending outward from the second carrying portion 523. The second protrusion portion 524 includes a fourth butting surface 525 facing toward the third butting surface 513. The second carrying portion 523 includes two opposite fourth carrying surfaces 526 and a fourth backside 527 opposite to the fourth butting surface 525. Each of the fourth carrying surfaces 526 defines a number of fourth fixed grooves 528; the fourth fixed grooves 527 are substantially parallel to each other. Each extending direction of the fourth fixed grooves 527 is perpendicular to the fourth butting surface 525, and passes through the fourth butting surface 525 and the fourth backside 527. In the present embodiment, each of the fourth carrying surfaces 526 defines a third receiving groove 526a. The fourth fixed grooves 528 include third trenches 528a and third through holes 528b. The third trenches 528a are set on the bottom surface of the third receiving groove 526a, the third through holes 528b pass through an inner wall of the third receiving groove 526a and the fourth butting surface 525, and are conductively connected with the third trenches 528a. The plurality of the fourth optical coupling lenses 522 is received into the plurality of third through holes 528b, and is exposed from the fourth butting surface 525.

The second protrusion portion 524 is inserted into the third housing groove 515. The fourth butting surface 525 defines two sixth positioning members 529 (e.g., positioning column) corresponding to the two fifth positioning members 518. The two sixth positioning members 529 match the two fifth positioning members 518, enabling the plurality of fourth optical coupling lenses 522 to be precisely aligned with the plurality of third optical coupling lenses 512, to complete an optical coupling. Numbers of the plurality of first, second, third and fourth fixed groove 317, 417, 517, and 528 are equal, and correspondingly arranged.

Each of the plurality of first optical fibers 60 includes a first end 61 and an opposite second end 62. The plurality of first ends 61 are received and are fixed in the plurality of first fixed grooves 317, and separately corresponding to the plurality of first optical coupling lenses 32. The plurality of second ends 62 are received and are fixed in the plurality of fourth fixed grooves 528, and separately correspond to the plurality of fourth optical coupling lenses 522. In the present embodiment, the plurality of first optical fibers 60 are separately fixed with the plurality of first fixed grooves 317 and the plurality of fourth fixed grooves 528 via an adhesive.

The plurality of second optical fibers 70 include a third end 71 and an opposite fourth end 72. The plurality of third ends 71 are separately received and are fixed in the plurality of second fixed grooves 417, and separately corresponding to the plurality of second optical coupling lenses 42. The plurality of fourth ends 72 are separately received in the plurality of third fixed grooves 517. In the present embodiment, the plurality of second optical fibers 70 are separately fixed with the plurality of second fixed grooves 417 and the plurality of third fixed grooves 517 via an adhesive.

The working process of the optical signal transmission device 100 are as described below: The first photoelectric converting device 10 is configured to receive first electrical signals from the first electronic device 200, convert the first electrical signals into first optical signals. The first optical signals are collected by the plurality of first condensing lenses 13 and the plurality of first optical coupling lenses 32, and are output into the plurality of first optical fibers 60. In addition, the first optical signals are transmitted by the plurality of first optical fibers 60, and then collected by the plurality of fourth optical coupling lenses 522 and the plurality of third optical coupling lenses 512, enter the plurality of second optical fibers 70 and continue to be transmitted by the second optical fibers 70. The first optical signals are collected again by the plurality of second optical coupling lenses 42 and the plurality of second condensing lenses 23. The first optical signals are output into the second photoelectric converting device 20, the second photoelectric converting device 20 and then are converted into the first electrical signals, and transmitted into the second electronic device 300. On the contrary, the second photoelectric converting device 20 is configured to receive second electrical signals from the second electronic device 300. In addition, converts the second electrical signals into second optical signals, which are sequentially transmitted through the second connectors 40, the plurality of second optical fibers 70, the first adapter portion 51, the second adapter portion 52, and the plurality of first optical fibers 60.

The second optical signals then enter the first photoelectric converting device 10, converted into the second electrical signals, and transmitted to the first electronic device 200.

The optical signal transmission device 100, transfers an information through the optical signals, transmission speed is relatively fast, and without external electromagnetic interference, therefore, quality of transmission of the signal is relatively high. Furthermore, because of the optical signal transmission device 100 defines the adapter module 50 between the plurality of first optical fibers 60 and the plurality of second optical fibers 70. The manufacturing process of the first and second electronic device 200 and 300, allow the first connector 30, the second adapter portion 52 and the plurality of first optical fibers 60 to be arranged in the first electronic device 200. In addition, the second connector 40, the first adapter portion 51, and the plurality of second optical fibers 70 can be arranged in the second electronic device 300. Therefore, the first and second photoelectric converting devices 10 and 20 do not need to be set in the casing around of the first and second electronic device 200 and 300, and allow more flexibility with the position arrangement of the photoelectric converting devices 10, 20, in the electronic devices 200 and 300.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. An optical transmission device, comprising:
   a first photoelectric converting device converting electrical signals from a first electronic device into optical signals, and converting received optical signals into electrical signals, the first photoelectric converting device comprises a first body, the first body comprises a first fixed surface, the first fixed surface defines a first housing groove;
   a second photoelectric converting device converting electrical signals from a second electronic device into optical signals, and converting received optical signals into electrical signals, structure of the second photoelectric converting device is the same as the first photoelectric converting device, the second photoelectric converting device comprises a second fixed surface, the second fixed surface defines a second housing groove, the second housing groove defining a second recess at a central portion of the second housing groove, the second condensing lenses being exposed from the second recess;
   a first connector comprising a first carrying portion and a first protrusion portion extending outward from the first carrying portion, a size of the first protrusion portion matches with the first housing groove, the first carrying portion includes two first carrying surfaces opposite to each other, each of the first carrying surfaces defines a plurality of first fixed grooves, the first fixed grooves are substantially parallel to each other;
   a second connector, structure of the second connector is the same as the first connector, and comprising a plurality of second fixed grooves, the second fixed grooves are substantially parallel to each other;
   a plurality of first optical fibers comprising a first end and an opposite second end;
   a plurality of second optical fibers comprising a third end and an opposite fourth end; and
   an adapter module comprising a first adapter portion and a second adapter portion, wherein the first adapter portion comprises a plurality of third fixed grooves, the third fixed grooves are substantially parallel to each other; wherein the second adapter portion comprises a plurality of fourth fixed grooves, the fourth fixed grooves are substantially parallel to each other; wherein the first end is fixed in the corresponding first fixed groove, the second end is fixed in the corresponding fourth fixed groove, the third end is fixed in the corresponding second fixed groove, the fourth end is fixed in the corresponding third fixed groove; and
   wherein the first photoelectric converting device further comprises a plurality of first condensing lenses corresponding to the plurality of first ends; the second photoelectric converting device further comprises a plurality of second condensing lens corresponding to the plurality of third ends; the first connector further comprises a plurality of first optical coupling lenses corresponding to the plurality of first ends; the second connector further comprises a plurality of second optical coupling lenses corresponding to the plurality of third ends; the plurality of first optical coupling lenses are aligned with the plurality of first condensing lenses to complete an optical coupling, the plurality of second optical coupling lenses are aligned with the plurality of second condensing lenses to complete an optical coupling.

2. The optical signal transmission device as claimed in claim 1, wherein the first photoelectrical converting device comprises at least two first positioning members, the second photoelectric converting device comprises at least two second positioning members, the first connector comprises at least two third positioning members, the second connector comprises at least two fourth positioning members, the at least two third positioning members match with the at least two first positioning members, enabling the plurality of first optical coupling lenses to be aligned with a plurality of first condensing lenses, to complete an optical coupling; the at least two fourth positioning members match with the at least two second positioning members, enabling the plurality of second optical coupling lenses to be aligned with a plurality of second condensing lenses, to complete an optical coupling.

3. The optical signal transmission device as claimed in claim 1, wherein the first adapter portion comprises a plurality of third optical coupling lenses corresponding to the plurality of fourth ends; the second adapter portion comprises a plurality of fourth optical coupling lenses corresponding to the plurality of second ends, enabling the plurality of fourth optical coupling lenses to be aligned with the plurality of third optical coupling lenses, enabling the plurality of third optical coupling lenses to be aligned with the plurality of fourth optical coupling lenses to complete an optical coupling.

4. The optical signal transmission device as claimed in claim 3, wherein the first adapter portion comprises at least two fifth positioning members, the second adapter portion comprises at least two sixth positioning members, the at least two fifth positioning members match with the at least two sixth positioning members, enabling the plurality of third optical coupling lenses to be aligned with a plurality of fourth optical coupling lenses, to complete an optical coupling.

5. The optical signal transmission device as claimed in claim 1, wherein the first connector comprises a first butting surface facing towards the first photoelectric converting device, a plurality of first optical coupling lenses are arranged on the first butting surface, the second connector comprises a second butting surface facing towards the second photoelectric converting device, a plurality of second optical coupling lenses are arranged on the second butting surface, the plurality of first fixed grooves separately pass through the first butting surface, the plurality of first optical coupling lenses are received into the plurality of first through holes, and are exposed from the first butting surface; the plurality of second fixed grooves separately pass through the second butting surface, the plurality of second optical coupling lenses are received into the plurality of second through holes, and are exposed from the second butting surface.

6. The optical signal transmission device as claimed in claim 5, wherein the first adapter portion comprises a third butting surface opposite to the second butting surface, the second adapter portion comprises a fourth butting surface facing towards the third butting surface, the plurality of third fixed grooves separately pass through the third butting surface, the plurality of third optical coupling lenses are received into the plurality of second through holes, and are exposed from the third butting surface; the plurality of fourth fixed grooves separately pass through the fourth butting surface, the plurality of fourth optical coupling lenses are received into the plurality of third through holes, and are exposed from the fourth butting surface.

7. The optical signal transmission device as claimed in claim 6, wherein the plurality of first optical fibers are separately fixed with the plurality of first fixed grooves and the plurality of fourth fixed grooves via an adhesive; the plurality of second optical fibers are separately fixed with the plurality of second fixed grooves and the plurality of third fixed grooves via an adhesive.

8. The optical signal transmission device as claimed in claim 5, wherein the second adapter portion comprises a fourth body and a plurality of fourth optical coupling lenses, the fourth body comprises a second carrying portion and a second protrusion portion extending outward from the second carrying portion, the second protrusion portion comprises a fourth butting surface facing toward the third butting surface.

* * * * *